(12) United States Patent
Wernlund et al.

(10) Patent No.: US 8,345,451 B2
(45) Date of Patent: Jan. 1, 2013

(54) DC TO AC CONVERTER THAT GENERATES THE SINE WAVE FROM THE PULSE WIDTH MODULATED SIGNAL

(76) Inventors: James V. Wernlund, Indialantic, FL (US); Roger F. Wernlund, Indialantic, FL (US); Zachary J. Wernlund, Durham, NC (US); Christian J. Wernlund, Palm City, FL (US)

( * ) Notice: Subject to any disclaimer, the term of this patent is extended or adjusted under 35 U.S.C. 154(b) by 266 days.

(21) Appl. No.: 12/942,002

(22) Filed: Nov. 8, 2010

(65) Prior Publication Data

US 2011/0157937 A1 Jun. 30, 2011

Related U.S. Application Data

(60) Provisional application No. 61/259,207, filed on Nov. 8, 2009.

(51) Int. Cl.
*H02M 3/335* (2006.01)
*H02M 1/12* (2006.01)
*H02M 1/14* (2006.01)

(52) U.S. Cl. ............... 363/17; 363/40; 363/41; 363/95; 363/98; 363/131; 363/132

(58) Field of Classification Search ............... 363/17, 363/40, 41, 95, 98, 131, 132
See application file for complete search history.

(56) References Cited

U.S. PATENT DOCUMENTS

| 4,860,186 | A * | 8/1989 | Maekawa et al. | 363/41 |
| 4,914,396 | A * | 4/1990 | Berthiaume | 327/106 |
| 5,757,633 | A * | 5/1998 | Bowles | 363/71 |
| 6,556,461 | B1 * | 4/2003 | Khersonsky et al. | 363/41 |
| 8,193,743 | B2 * | 6/2012 | Yamada et al. | 318/162 |
| 2010/0134053 | A1 * | 6/2010 | Yamada et al. | 318/162 |

* cited by examiner

*Primary Examiner* — Bao Q Vu
(74) *Attorney, Agent, or Firm* — John L. DeAngelis; Beusse Wolter Sanks Mora & Maire, P.A.

(57) ABSTRACT

A method and apparatus for converting DC electricity to AC electricity, the AC electricity having a sine wave shape. DC electricity is supplied to a pulse width modulator. A pulse width modulated signal is formed from the DC electricity, the pulse width modulated signal comprising a plurality of pulses, each pulse having a duration representing an amplitude of the sine wave during an interval of the sine wave represented by the pulse, the pulse width modulated signal comprising a plurality of pulses (or a pulse train) during one sine wave period. The sine wave is generated from the pulse width modulated signal, values of the sine wave during successive sine wave intervals responsive to the duration of the pulse that represents the sine wave interval.

20 Claims, 4 Drawing Sheets

DC TO AC CONVERTER THAT GENERATES THE SINE WAVE FROM THE PULSE WIDTH MODULATED SIGNAL

CROSS-REFERENCE TO RELATED APPLICATIONS

The present application claims priority under Section 119 (e) to the provisional application filed on Nov. 8, 2009 and assigned application No. 61/259,207.

BACKGROUND OF THE INVENTION

Frequently, in the fields of electricity and electronics, it is necessary to convert DC electricity to AC electricity. For example, alternative energy sources, such as solar and wind energy, harness the sun or wind by generating a DC voltage. For effective and optimal use of the generated energy it is converted to AC for powering common home and commercial loads. It may also be desired to supply excess AC electricity to the electrical grid and/or to charge energy storage devices for later use when electricity is required.

BRIEF DESCRIPTION OF THE FIGURES

The present invention can be more easily understood and the advantages and uses thereof more readily apparent when the following detailed description of the present invention is read in conjunction with the figures wherein.

In accordance with common practice, the various described features are not drawn to scale, but are drawn to emphasize specific features relevant to the invention. Like reference characters denote like elements throughout the figures and text.

DETAILED DESCRIPTION OF THE INVENTION

Before describing in detail the methods and apparatuses for converting DC to AC, it should be observed that the present invention resides primarily in a novel and non-obvious combination of elements and process steps. So as not to obscure the disclosure with details that will be readily apparent to those skilled in the art, certain conventional elements and steps have been presented with lesser detail, while the drawings and the specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

The present invention relates to a DC to AC converter that in one embodiment has a conversion efficiency of about 95% or better. Additionally, a frequency/phase of the generated sine wave can be locked to the phase of another signal (such as a power line grid frequency) and an amplitude of the sine wave can be adjusted. In one application, the present invention receives a DC voltage from a solar panel and converts the DC voltage to an AC voltage phased locked to the power line frequency and amplitude adjusted such that it can feed the grid.

The present invention generates a sine wave (or a sine wave approximation) using a DC voltage (e.g., from a solar panel that converts sunlight to DC electricity). To convert the DC electricity to AC, according to the present invention, one determines a length of time to open/close switches that create a pulse-width modulated pulse train that can then be used to recreate an approximate 60 Hz sine wave, or another waveform as desired. During the first quarter cycle, the pulse widths (durations) increase to represent ascending sine wave values (e.g., increasing voltages) and during the second quarter cycle the pulse widths decrease to represent descending sine wave values (e.g., decreasing voltages). The current direction is reversed during a third quarter cycle of descending negative values and ascending negative values during a fourth quarter cycle.

If it is desired to convert the DC electricity to 60 Hz sine wave AC electricity, the sine wave is segregated into n slices and each slice is represented by a pulse; a plurality of such varying-width pulses represent one complete cycle of the sine wave. Each pulse of the pulse train has a pulse density characteristic. For example, for a 2 volt peak-to-peak sine wave (0 to 1 volt amplitude for the positive half cycle and 0 to −1 volt amplitude for the negative half cycle), the pulse density for any slice represents the value of the sine wave amplitude at some point during that slice or interval. In one embodiment the value of the sine wave at the midpoint of each interval is considered the value of the sine wave during that interval. According to other embodiments the value during the interval can be a value at the beginning of the interval, a value at an end of the interval, an average of the values at the beginning and end of the interval, or an average of a finite number of values during the interval.

For a sine wave with an amplitude greater or lesser than 1 volt peak, the pulse density is again the value of the sine wave for that interval, multiplied by the peak sine wave amplitude. Thus sine waves having a peak of other than 1 volt can be represented and reproduced according to the present invention.

Using a 1 volt pulse train, (it is known that for square wave pulses a peak-to-peak value is the same as an RMS value) the variable pulse densities (i.e., variable pulse widths) represent the ascending and descending sine wave values. The invention can also be used to generate a sine wave with a DC offset, such as ±0.5 volts.

The pulse density for each pulse reflects an amount of time that the pulse is "on" (the time during which the pulse amplitude is at the pulse value, where the pulse value is typically selected as one volt). For example, for a 2 volt peak-to-peak sine wave, during one of the n sine wave intervals a value of the sine wave is 0.3 and for another interval the value of the sine wave is 0.5. When the pulse train is formed to represent the sine wave, a pulse width or pulse duration representing the 0.5 sine wave value is about 1.66 (0.5/0.3) times longer than the pulse width of the pulse representing the 0.3 sine wave value.

Figure 1:
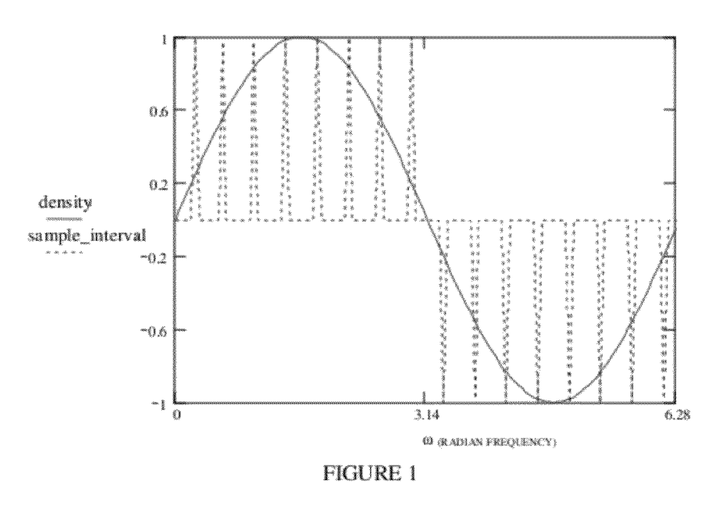
FIG. 1 illustrates a sine wave and density values associated with the sine wave.

Further, for n=16 slices, during each of the 16 intervals, the sine wave amplitude during each interval governs the "on" time of the pulse during that interval. For example, for n=16 and a 60 Hz sine wave, a duration of each interval is 16.6 ms/16=1.04 ms. Assume that the sine wave value during interval number three is about 0.7. Then during the third interval, the pulse is on for about 0.728 ms=0.7×1.04 ms. Preferably, the value of the sine wave during each interval is the value of the sine wave at a midpoint of the interval. See FIG. 1.

In one embodiment, a waveform with an offset of 0 volts, for example, can be synthesized using two PWM (pulse width modulated) sources tied to opposite supplies or tied differentially to a transformer. Since a transformer is needed to generate a voltage sufficient to drive the grid, the second approach is generally preferred. Sine waves with positive or negative offset voltages can also be generated by appropriate selection of the supply voltages.

To generate the pulse train of the present invention, one embodiment uses semiconductor switches (e.g., MOSFETS, bipolar transistors, thyristors, etc). The on and off times of the switches are based on the pulse density as explained and determined above. Techniques for controlling the semiconductor switches to generate the varying density pulses is well known in the art.

Using the approach of the present invention, a very efficient DC to AC converter can be built, achieving a 95% or higher conversion efficiency. Furthermore by adjusting a location of the zero density point in the pulse train (relative to the sine wave), the point at which the recreated sine wave begins can be controlled. Thus the synthesized 60 Hz signal can be phase locked to the line frequency using a reference that controls the location of the zero density point.

The density of the pulses can be modified to reflect any amplitude for the synthesized sine wave. Since the density can never be greater than 100%, if the density is nominally 90% the density can be modified to decrease the density to 80% or increase it to 100%, changing the amplitude of the generated sine wave (at 60 Hz) also by +/−10%.

When the invention is employed to supply power to the grid, the generated sine wave must have an amplitude greater than the grid voltage for power to flow from the source of the DC voltage (e.g., a solar generating site) into the grid. The amplitude of the recreated sine wave can thus be adjusted (by use of a transformer, for example) to maintain power flow into the grid.

If the density point is shifted, the phase of the waveform can also be adjusted. The ability to adjust both the amplitude and phase of the generated waveform is important to maximize power transfer to the grid. Also, by adjusting the amplitude and/or the phase of the generated 60 Hz waveform, the present invention can correct for variations in power factor resulting from inductive or capacitive loads, minimizing the power dissipated in the source and the reactive power in the power system.

The amplitude of the generated AC waveform is sufficient to generate positive power flow to the load. Thus the invention ensures that the source of a DC voltage, be it solar, water or any other DC source, operates in such a fashion that optimum positive power is supplied to the load. In the examples detailed here the source is a solar cell or a solar array. The source must generate positive power flow into the grid; later details demonstrate complex power flow for the purposes of transferring maximum power to the load or grid.

The invention can be explained by the following example. In this example a 60 Hz sine waveform is divided into 16 intervals. For a 1 volt sine wave output, the density values for each interval are given by:

$\sin(n*2*pi/16)$ where $n=0$ to $15$.

The density of the first interval (n=0) is 0 because the value of the sine wave at the beginning of the first interval is zero. The density of the second interval (n=1) is 38% and the density of the fifth interval (n=4) is 92.3%. The expression above results in negative densities, which simply means that the direction of current flow is reversed. This reversal is addressed in the details of the circuit design.

Table A below sets forth pulse density values for a pure sine wave of amplitude 1 (i.e., 1 volt) wherein the pulse densities representing the sine wave are calculated at 100% of the sine wave value during the respective interval. Table B sets forth the pulse densities for pulses representing 90% of the sine wave value. The Table B values are determined by multiplying the Table A values by 90% (i.e., 0.9 sin(n*2*pi/16). The Table B values represent a condition where the amplitude can be adjusted +/−10%.

Note that the values set forth in Table A indicate that this representation suffers from an inability to increase the output voltage.

TABLE A

| Phase | | 100% Densities |
|---|---|---|
| Θ in deg | Θ in radians | sine(Θ) |
| 0 | 0 | 0 |
| 22.5 | 0.392699 | 0.3826834 |
| 45 | 0.785398 | 0.7071067 |
| 67.5 | 1.178097 | 0.9238794 |
| 90 | 1.570796 | 1 |
| 112.5 | 1.963495 | 0.9238797 |
| 135 | 2.356194 | 0.7071071 |
| 157.5 | 2.748893 | 0.382684 |
| 180 | 3.141592 | 0 |
| 202.5 | 3.534291 | −0.3826828 |
| 225 | 3.92699 | −0.7071062 |
| 247.5 | 4.319689 | −0.9238792 |
| 270 | 4.712388 | −1 |
| 292.5 | 5.105087 | −0.9238799 |
| 315 | 5.497786 | −0.7071076 |
| 337.5 | 5.890485 | −0.3826846 |

TABLE B

| Phase | | 90% Densities |
|---|---|---|
| Θ in deg | Θ in radians | 0.9sine(Θ) |
| 0 | 0 | 0 |
| 22.5 | 0.392699 | 0.344415 |
| 45 | 0.785398 | 0.636396 |
| 67.5 | 1.178097 | 0.831491 |
| 90 | 1.570796 | 0.9 |
| 112.5 | 1.963495 | 0.831492 |
| 135 | 2.356194 | 0.636396 |
| 157.5 | 2.748893 | 0.344416 |
| 180 | 3.141592 | 0 |
| 202.5 | 3.534291 | −0.344414 |
| 225 | 3.92699 | −0.636396 |
| 247.5 | 4.319689 | −0.831491 |
| 270 | 4.712388 | −0.9 |
| 292.5 | 5.105087 | −0.831492 |
| 315 | 5.497786 | −0.636397 |
| 337.5 | 5.890485 | −0.344416 |

Using the values presented in Table B for a 0.9 V peak sine wave value, it can be seen that the sine wave has a density of 0% for the first interval, a density of about 34.4% for the second interval, a density of about 63.7% for the third interval, a density of about 83.1% for the fourth interval and a density of about 90% for the fifth interval, which correlates to the peak of the sine wave. The density pattern continues down to a zero density and then to negative densities indicating a reverse current flow. The pulse train waveform of FIG. 2 results from these densities. This type of pulse width modulation can be implemented using a small micro-controller, which also controls a position of the load switch.

Figure 2:
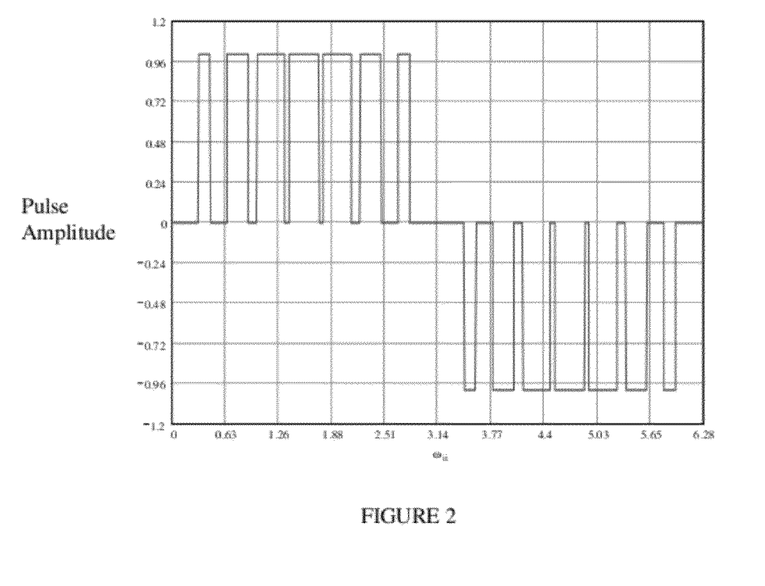
FIG. 2 illustrates pulses of varying density that are used to generate a sine wave according to the present invention.

The waveform of FIG. 2 is one of many that can produce the proper density for the interval and thus the proper sine wave values for the AC voltage. The FIG. 2 waveform was selected to emphasize the concept of the present invention.

In another embodiment, spread spectrum techniques are applied to each individual pulse in the pulse train, i.e., over the interval of each pulse. These spread spectrum techniques ease the filtering requirements for suppressing waveform edges. Rather than generating a single pulse for each slice with an on-time equal to the density for that interval, a series of pulses are used, where the ratio of on-time to off-time for all the pulses during the interval is the same as the ratio for a single pulse. This technique spreads the individual pulse energies over a wider bandwidth and eases filtering requirements. The technique is referred to as spread spectrum and is a result of the sin x)/x spectrum of a single pulse. The narrower the pulse width the wider the bandwidth of the spread energy. Ideally the technique uses different patterns within a slice each time a slice is generated. Thus there is no periodic energy component and the filters must simply filter out the high frequency energy of the pulses while passing the DC value. As the pulse durations narrow, the undesired high frequency energy content increases. At some point the losses in the high speed switches used to generate the pulses begins to dominate the efficiency and the efficiency begins to decline.

One application for the present invention comprises a solar energy system. When the converted AC electricity from a solar generating unit is synchronized to the phase of the AC electricity on the grid and amplitude-adjusted (as described above), the solar-derived electricity can be supplied to the grid. The solar energy can also be stored in the grid (or at a local site proximate the solar panel, for example, in a battery) during the day and drawn from the grid during times when solar power is not available. Additionally when the solar energy is not sufficient to supply the power demand, grid-supplied energy can supplement the solar source.

Figure 3:
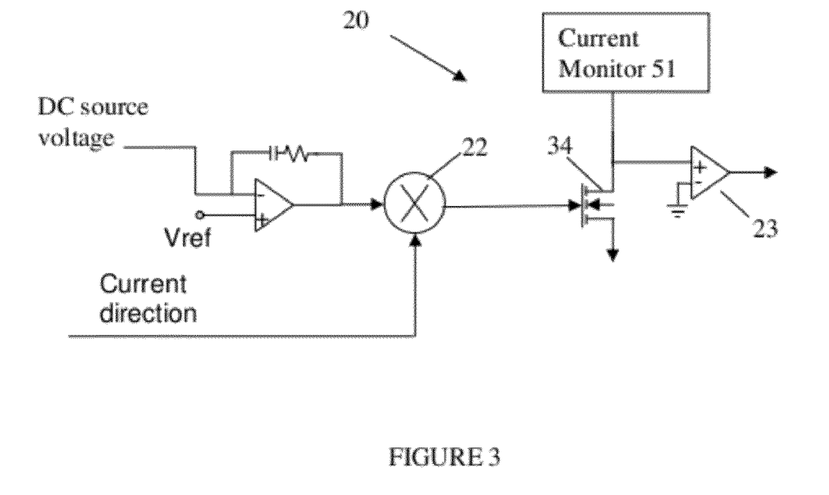
FIG. 3 illustrates a control loop for generating the AC waveform, from a DC voltage, according to the present invention.

In the case of a solar cell or a solar cell array, the source is a current source with the generated voltage dependent on the load. The controlling parameter for the load is then the voltage generated by the solar current source. A linear control loop 20 controls the load seen by the local power source based on the voltage of the local source and a reference voltage (Vref) as shown in FIG. 3. The reference voltage can be static or change dynamically as desired. A signal supplied to a multiplier 22 indicates the current direction as derived from FETS Q3 and Q4 of FIG. 6. This control loop alters the load seen by the source while maintaining the desired operating voltage for the solar cell. In simplest application of the concept, the FETS Q1 and Q4 (see FIG. 6) are off for all supply voltages with negative current flows. These FETS gradually turn on for supply voltages with positive current flow and positive voltages and for negative current flows and negative current flows depending on the phase of the synthesized waveform. In FIG. 3 the current direction is dependent on the phase of the generated signal. A synthesized negative voltage results in a negative current and a synthesized positive voltage results in a positive voltage. The actual phase (positive or negative) may change depending on where in the circuit the current is monitored. An output of an op amp 23 in FIG. 3 controls the FETS Q1 and Q4 of the FIG. 5 implementation, or the FETS 32 and 33 of the FIG. 5 implementation.

The control loop can be configured to adjust the load seen by the converter such that the desired operating point of the DC source is maintained. The lock point is then the load presented to the converter that maintains the desired operating point of the DC source for a desired operating density. The concept also includes the idea that the load offered by the grid is not necessarily real and thus the voltage synthesized by the proposed approach might be better, and more efficiently, served by a waveform that approximates a waveform different than a sine wave. Such waveforms are realized through the convolution of the output with the input and allow the negative effects of power factor to be minimized or eliminated. A power factor of one ensures maximum power is delivered to the load. Power companies charge a premium for power factors less than 1 as they have to absorb the imaginary/reflected/reactive power. By monitoring the current and the voltage at the primary side of the transformer the phase between the current and voltage can be monitored and the power factor calculated. The waveform can then be modified such that the voltage and current are in phase. Analysis of these waveforms enables the detection and measurement of complex load impedances and adjustment of the source delivering power to a complex load. Integration of a controller or a digital signal processor enables the shape of the synthesized waveform to be optimized to the load for optimum power transfer.

Figure 5:
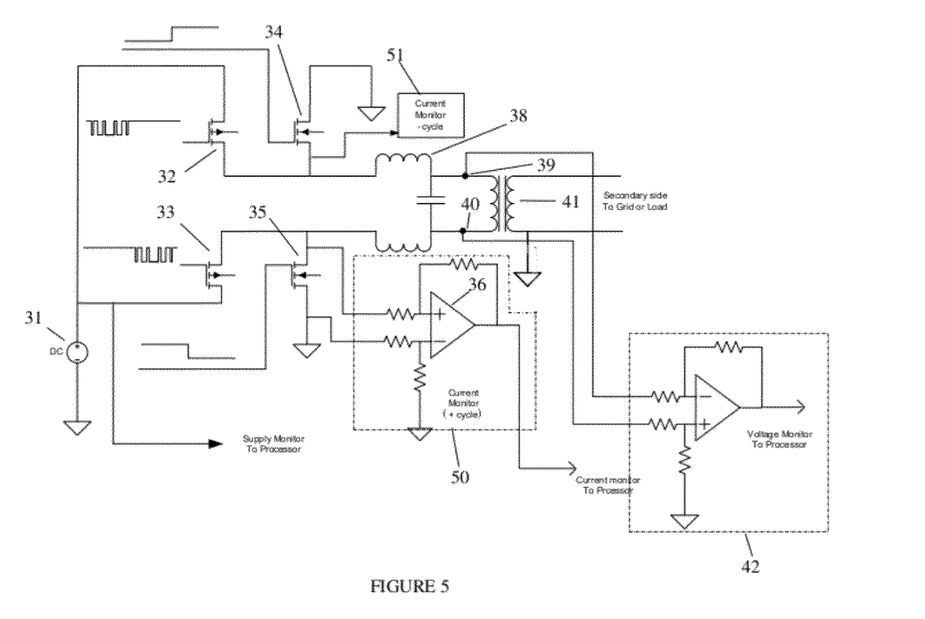
FIGS. 5, 6 and 7 illustrate circuits for controlling components and for generating a sine wave based on a DC voltage according to the present invention.

In FIG. 5 the voltage monitored across FETS 34 and 35 is in effect a current monitor. Using the current monitors FETS 34 and 35 and a voltage monitor, a control point can be generated. This control point defines the operating point of the PWM synthesizer circuit both from a gain (amplitude) and phase perspective. Note that the loading effects of the monitor circuit can be easily removed from the measurement as is known by those skilled in the art. The load-adjusting waveform is addressed by the synthesized waveform. The circuit enables both the amplitude and phase to be adjusted in that the amplitude and the phase of the synthesized waveform can be adjusted by changing the time and amplitude of the calculated density. The drive level of the pulses depicted as input to a gate of each of the FETS 34 and 35 can be adjusted to isolate the DC source from the grid in an application where the DC source supplies power to the grid.

The embodiment of FIG. 3 therefore presents a primary control loop that ensures positive power flow and optimum power conditions and a secondary control loop that adjusts both the phase and amplitude of the synthesized waveform for maximum power transfer to a complex load. The secondary control adjusts the relative density phase and amplitude to obtain an effective source impedance that is the complex conjugate of the load, grid. Simply stated the low bandwidth control loop stabilizes the DC source loading and then a separate control loop adjusts the shape of the waveform such that the source looks like the complex conjugate of the load maximizing the power transfer.

The design is such that it can be implemented at the solar panel level where current densities are relatively small and the circuits simply paralleled to supply greater amounts of energy. Each solar panel adjusts to the complex load providing maximum power transfer.

Figure 4:
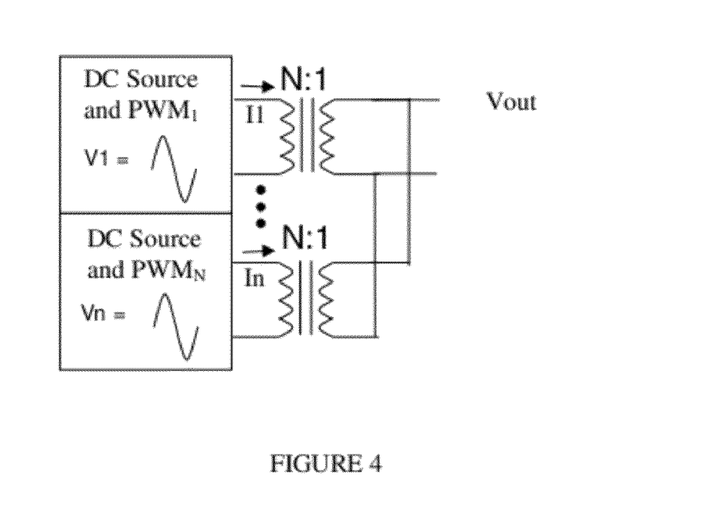
FIG. 4 illustrates a circuit for generating a sine wave, from a DC voltage, using pulse width modulators.

In FIG. 4, power flows from the source to the grid whenever Vout (Vout=N^2×(V1)) is greater than Vgrid. Each source generates approximately the same output voltage so that the currents are summed. That is, Iout=((I1+I2+ . . . In)/N^2). Although two sources are shown in FIG. 4, there are no limits on the number of sources that can be configured in a parallel arrangement. Also, other periodic waveforms can be synthesized to compensate for complex load impedances.

In FIG. 4, the blocks labeled "DC Source and PWM" implement the techniques described above for generating the AC sine wave from a DC value.

As explained herein, the system of the invention comprises a single-phase converter system, but the concepts of the invention can be used to generate three phase power (or power for any number of phase conductors).

If there is no intent to supply energy to the grid then there is no need to supply a 60 Hz reference to the control loop of the present invention as shown in FIG. 3. In one embodiment the hardware, which is required whether or not one synchronizes to the grid, comprises a micro-controller, FET switches and an LC filter.

The circuit illustrated in FIG. 5 uses a transformer to boost the synthesized AC voltage to the desired AC level and eliminates the DC offset associated with this technique. The drive level of the grounding FETS 34 and 35 of FIG. 5 can be used to isolate the DC source from the grid when the power from the DC source is insufficient to drive the grid.

Transformer losses occurring when the grid is trying to drive the open circuit DC source can be minimized by placing a FET on the high side rather than using the DC grounding FETS 34 and 35 to isolate the DC source from the grid. A simple rectifier and an op-amp comparator determine the isolation needed to prevent the DC source from trying to deliver too much power. A storage capacitor eliminates current pulsing from the DC source, which in one embodiment comprises a bank of solar cells. If the transformer is replaced with a transformer having a center taped secondary, an output voltage of 230/115 volts is generated. In another embodiment, multiple circuits can be used to provide 208/120 V three-phase power to the grid.

The components presented in FIG. 5 are described below.

Element 31 is a DC source. Any DC source can be used, although in a preferred embodiment the DC source comprises a solar panel. Additionally element 31 includes filters required to support large pulsing currents associated with the PWM circuits.

Elements 32 and 33 are FETS for connecting the DC supply to the output filter and transformer. FIG. 5 illustrates N-channel FETS 34 and 35 driven by low level pulses (an on state is the 0 level of the pulse train, rather than a 1 level). Element 32 generates the PWM modulated pulses while element 35 is shorted to ground, and element 33 generates the PWM modulated pulses while element 34 is shorted to ground.

Elements 34 and 35 are grounding FETS as described above. They supply ground to the low side of a transformer 38. These N-channel FETS short a source to drain, grounding circuit points 39 or 40. A logic high level forces the shorting condition.

Element 36 is a differential amplifier with associated components that is used to monitor current flow in the grounding FET 35 during positive cycles of the sine wave. The circuit referred to as a current monitor (+cycles) and indicated by a reference character 50. A similar circuit (identified as a current monitor (−cycle) 51) monitors current flow in the grounding FET 34. The ohmic resistance of each FET 34 and 35 is used as the current sensing resistor.

An output from the differential amplifier 36 is supplied to a processor for monitoring current. It is the directional current flow in FETS 34 and 35 that indicate the direction of power flow. This voltage is sent to the processor as an input for the control loops.

Element 38 is a differential filter for filtering out the high frequency switching noise of the PWM. More complicated filter structures can be used, but in general may not be required.

Elements 39 and 40 comprise the primary side terminals of the transformer. The PWM pulse train is switched from terminals 39 to 40 and back again continuously every half-cycle. While the PWM pulse train is pulsing terminal 39, ground is switched to the terminal 40 and vice versa every half cycle.

Element 41 is the secondary side of the transformer connected directly to the load or grid depending on intended use of the invention. The transformer secondary 41 can be replaced with a grounded center-tapped secondary winding for generating a 230 VAC secondary output voltage.

Element 42 is a primary transformer side voltage monitor that is supplied to a processor for the control loops. The product of the voltage and current monitors is calculated in the processor. This product controls power flow in more complicated waveforms such as power factor compensation network.

Figure 7:
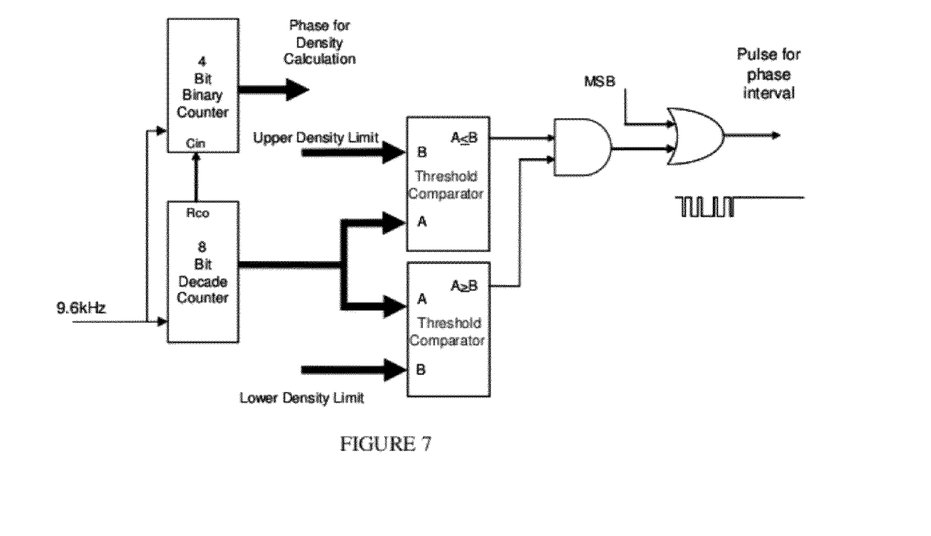

Returning to the example set forth above, the density function can be easily implemented using a counter string clocked at a rate of 100×16×60 Hz=96 kHz. FIG. 7 is one example of such a digital implementation. To be consistent with the previous example an 8 bit decimal counter is cascaded with a 4 bit binary counter. Each time the decimal counter rolls over (as indicated by a signal on the Rco terminal) a new low and high threshold value is calculated and a compare operation is performed. The high and low thresholds are calculated based on the density for the pulse interval. The low threshold is (100−density)/2=50−(density/2) and the high threshold is 100−(100−density)/2=50+(density/2). The high and low thresholds correspond to the beginning and end of the high state. The slice interval is typically wider except for the 100% point. As before, in one embodiment these densities are found by evaluating the sine function at the middle of the approximation interval (or another value is used based on values of the sine wave during the interval). A base 10 decade counter is used for the density interval as the densities correlate directly to the compare limits calculated above. Any base can be used; most applications use a base 2 numbering system. Additionally a randomization of the density within the interval eases the filtering requirement. This randomization process is described above in the spread spectrum discussion.

FIG. 7 illustrates the control functions for one-half of a cycle. The second half of the cycle requires additional gating logic, similar to that illustrated, as is known by those skilled in the art.

Two counters are illustrated in FIG. 7, an 8 bit decade counter and a 4 bit binary counter. Using the decade counter simplifies the correlation between density and the state of the decade counter. For example if the density is 50% then a lower limit of 25 and an upper limit of 75 results in a pulse of 50 counts. For the first 25 counts the output of the AND gate is low. For the next 50 counts the AND gate output is high and for the final 25 counts the AND gate output is low again.

The digital threshold comparators (one having an upper limit and the other a lower limit, center the density pulses within the interval. In an embodiment using a PN spreading, the pulsing within any density interval is random but the density is still maintained.

The four-bit binary counter keeps track of the current interval, within the 16 intervals of the 60 Hz cycle. The four-bit binary counter counts up once for every 100 counts of the decade counter. Thus its output indicates the current interval of the 16 intervals. The MSB of the four-bit binary counter gates the control pulse from the two threshold comparators as for one-half (8 density intervals) of the intervals the control signal to FETS 32 and 33 are gated off. Additionally the FETS 34 and 35 are gated on or off for half the interval. This gating information is contained in the MSB of the binary counter.

If we start at the interval and define the starting state of the binary counter as 0 and the starting state of the decade counter as 0 then the following sequence follows.

a. The density is set to zero. Therefore the upper and lower density limits are 100
   b. The decade counter counts 0 to 99.
      i. No pulse is generated as the upper and lower limits are always greater than the count.
   c. At the end of the decade count cycle (0-99) an Rco pulse is generated and the Cin on the binary counter enables the binary counter to count from 0 to 1.
   d. The decade counter rolls over and begins to count again from 0. This time during the count sequence the upper and lower limits are set to enable pulses that are equal to the density to be generated.
      i. For this interval assuming a 1 volt peak sine wave the density is 0.383. The lower limit is set to 38/2=19 and the upper limit is set to 99−38/2=99−19=80.
      ii. For a count of 0 to 19 no pulse is output, from a count of 20 to 80 a pulse is generated and then from a count of 82 to 99 the output is 0 again.
      iii. The decade counter again generates a carry out pulse and the binary counter counts from 1 to 2.
   e. This process continues until the binary counter counts to 8 at that point the MSB transitions to a logic one and the pulsing sequence for (32) is gated off until the binary counter rolls over. At which time the process begins again.
   f. Note as the binary counter counts from the 8 to 15 (33) is gated on and off by the densities to the threshold comparators. This can be accomplished using an AND gate instead of the OR gate to gate the threshold comparator outputs.

In summary the binary counter keeps track of which one of the 16 intervals within the 60 Hz waveform is the current interval and the decade counter gives a count of 100 within each of the 16 intervals. The decade counter is then used to generate the density pulses. Additionally the MSB or the MSB inverted, of the binary counter, is used to gate the FETS 34 or 35 on as needed.

Figure 6:
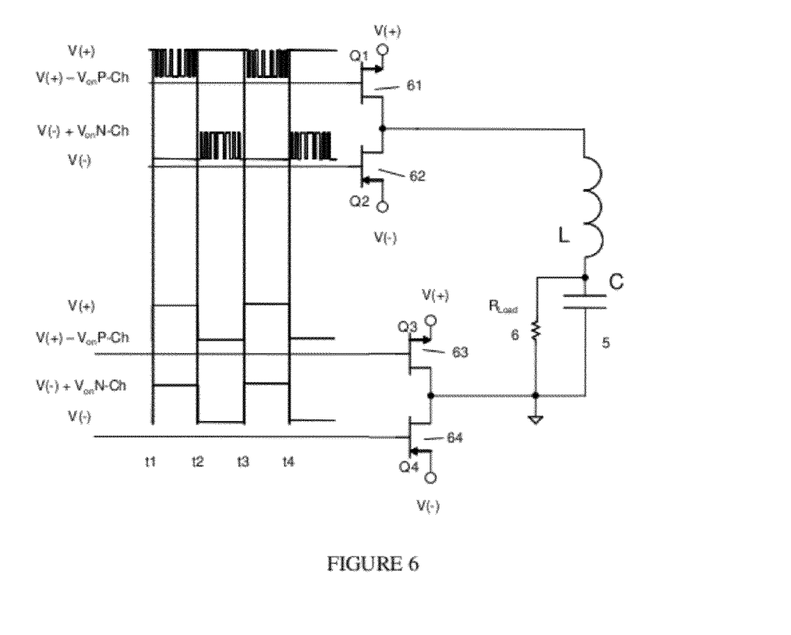

A transformerless design can be implemented if the DC source can be stacked to a voltage exceeding the intended load voltage. This embodiment is shown in FIG. 6. Here the transformer is eliminated by switching the load ground line to the DC source using FETS Q3 (63) and Q4 (64). The positive part of the cycle is generated by connecting V− to the ground line through the n-channel FET Q4 (64) and pulsing the p-channel FET Q1 (61) on and off. The negative part of the cycle is generated by connecting V+ to the ground line through the p-channel FET Q3 (63) and pulsing the n-channel FET Q2 (62) on and off. The peak output voltage is therefore equal to V(+)− V(−)=Vpeak (out).

During the positive cycle the n-channel FET Q4 (64) is off and during the negative cycle the p-channel FET Q3 (63) is off. The switching of the ground signal occurs when the output is 0 volts, which corresponds to the first interval and the ninth interval where both output switches Q1 and Q2 are off so there is no power lost during the switching. This corresponds to time t1, t2, t3 and t4 of Tables A and B. All of the previous claims associated with the transformer design apply. Particularly the reduced filter complexity associated with the higher pulse count per cycle, and the spread spectrum techniques.

Continuing with FIG. 6, the illustrated components are described below.

Element 61 (Q1) is a p-channel FET that is pulsed on and off generating the positive cycle of the AC waveform. The on time and off times are based on the density associated with defined intervals.

Element 62 (Q2) is an n-channel FET that is pulsed on and off generating the negative cycle of the AC waveform. The on time and off time are based on the density associated with defined intervals.

Element 63 (Q3) is a p-channel FET that ties the positive side of the local DC supply to the load ground. It is turned on during the negative cycle of the synthesized waveform.

Element 64 (Q4) is an n-channel FET that ties the negative side of the local DC supply to the load ground. It is turned on during the positive cycle of the synthesized waveform.

Element 65 is a low pass filter used to smooth (isolate the DC or low frequency component of the synthesized waveform. Note it is preferred that the filter structure begin with an inductive element as a capacitor will short the high frequency components of the synthesized wave form to ground and result in wasted power.

Element 66 represents the load. This load can be any AC device. As before if the electrical grid is to be driven then the load is the grid.

A pulse generator for the positive cycle of a sine wave is illustrated in FIG. 7. The pulses for the second half of the cycle or negative cycle can be generated in a similar fashion in that the pulse used to drive the FET to ground is simply the most significant bit of the four bit binary counter and the density for the second cycle can be found by ignoring the MSB of the density number and using the inverted value for this bit to gate the second density FET. Note all of these calculations would be gated with the 9.6 kHz clock to avoid generating glitches with asynchronous logic. Phase locking the generated 60 Hz wave form can be accommodated by adjusting the frequency of the 9.6 kHz clock to the counters using standard phase lock loop techniques.

Various circuits and control schemes have been illustrated for gating on and off FETS to generate the pulse train illustrated in FIG. 2. These are merely exemplary implementations, as other circuits can be used to generate the pulse trains.

Although the invention has been shown and described with respect to a certain preferred embodiment or embodiments, it is obvious that equivalent alterations and modifications will occur to others skilled in the art upon the reading and understanding of this specification and the figures. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

What is claimed is:

1. A method for converting DC electricity to AC electricity having a sine wave shape, the method comprising:
   supplying the DC electricity to a pulse width modulator;
   creating a pulse width modulated signal from the DC electricity, the pulse width modulated signal comprising a plurality of pulses, each pulse having a duration representing an amplitude of the sine wave during an interval of the sine wave represented by the pulse, the pulse width modulated signal comprising a plurality of pulses during one sine wave period; and generating the sine wave from the pulse width modulated signal, values of the sine wave during successive sine wave intervals responsive to the duration of the pulse that represents the sine wave interval.

2. The method of claim 1 wherein the step of generating the sine wave comprises generating a positive half cycle of the sine wave period from pulses generated by a first pulse width modulator and generating a negative half cycle of the sine wave period from pulses generated by a second pulse width modulator.

3. The method of claim 1 wherein the sine wave comprises a 60 Hz sine wave and a number of pulses during one period of the sine wave comprises 16 pulses, each pulse having a duration of a product of 1.04 ms and the amplitude of the sine wave during the interval represented by the pulse.

4. The method of claim 1 wherein the amplitude of the sine wave during an interval comprises one of a value of the sine wave at a midpoint of the interval of the sine wave, an average of the value at a beginning and an end of the interval, an average of all values during the interval, and a value at the end of the interval.

5. The method of claim 1 wherein a first pulse from the plurality of pulses is divided into a further plurality of second pulses, and wherein a sum of on times and off times of the plurality of second pulses is equal to the respective on time and off time of the first pulse.

6. The method of claim 1 wherein the sine wave comprises a sine wave having a DC offset value.

7. The method of claim 1 further comprising generating a first pulse width modulated signal from a first pulse width modulator and a second pulse width modulated signal from a second pulse width modulator, the first pulse width modulated signal representing positive sine wave values and the second pulse width modulated signal representing negative sine wave values, the first and second pulse width modulated signals supplied differentially to a transformer.

8. The method of claim 1 further comprising supplying the AC electricity to an electrical grid, the method further comprising controlling an amplitude of the sine wave to a value greater than a grid voltage to maintain power flow into the grid.

9. The method of claim 8 wherein the method further comprises controlling one of a phase and an amplitude of the sine wave to control a power factor on the electrical grid.

10. The method of claim 1 further comprising controlling a location of a zero density point in the plurality of pulses to control a phase of the sine wave.

11. The method of claim 1 wherein the sine wave comprises a 60 Hz sine wave and the plurality of pulses during one period of the sine wave comprises n pulses, each pulse having a duration of a product of 60 Hz/n and the sine wave value during the interval represented by the pulse, further comprising controlling an amplitude of the generated sine wave by changing the sine wave value during the interval represented by the pulse.

12. A converter for converting DC electricity to AC electricity having a sine wave shape, the converter comprising:
a source of DC electricity;
a pulse width modulator for generating a pulse train comprising a plurality of pulses, each pulse having a duration representing an amplitude of the sine wave during an interval of the sine wave represented by the pulse, the pulse width modulated signal comprising a plurality of pulses during one sine wave period; and
a generator for generating the sine wave from the pulse width modulated signal, values of the sine wave during successive sine wave intervals responsive to the duration of the pulse that represents the sine wave interval.

13. The converter of claim 12 wherein the source comprises one or more solar panels for converting sunlight to DC electricity.

14. The converter of claim 12 wherein the pulse width modulator comprises one or more semiconductor switches controlled to generate pulses having a predetermined duration.

15. The converter of claim 12 wherein the sine wave comprises a 60 Hz sine wave and the plurality of pulses during one period of the sine wave comprises n pulses, each pulse having a duration of a product of 60 Hz/n and the sine wave value during the interval represented by the pulse.

16. The converter of claim 12 further comprising a transformer responsive to the sine wave for increasing a peak voltage of the sine wave and supplying an increased-peak voltage sine wave to a load.

17. The converter of claim 12 wherein the AC electricity is supplied to an electrical grid, the converter further comprising a controller for controlling one of a phase and amplitude of the sine wave to control a power factor on the electrical grid.

18. A converter for converting DC electricity to AC electricity having a sine wave shape, the converter comprising:
a first and a second pulse width modulator for generating respective positive-going and negative-going pulse trains, each of the positive and negative-going pulse trains comprising a plurality of pulses, each pulse within a pulse train having a duration representing an amplitude of the sine wave during a sine wave interval represented by the pulse;
a filter responsive to the positive-going and negative-going pulse trains for filtering the positive-going and negative-going pulse trains to produce a filtered positive-going pulse train and a filtered negative-going pulse train;
a transformer having a primary and secondary winding, the filtered positive-going pulse train and the filtered negative-going pulse train input to the respective first and second terminals.

19. The converter of claim 18 wherein a turns ratio of the transformer can be adjusted to generate a predetermined secondary voltage.

20. The converter of claim 18 wherein the AC electricity is supplied to a electrical grid load, the converter further comprising a controller for controlling one of a phase and an amplitude of the sine wave to control a power factor on the electrical grid.

* * * * *